US007890791B2

(12) United States Patent
Fukuyama

(10) Patent No.: US 7,890,791 B2
(45) Date of Patent: Feb. 15, 2011

(54) DISK ARRAY DEVICE, OPERATING METHOD THEREOF AND PROGRAM-STORING MEDIUM

(75) Inventor: Osanori Fukuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 369 days.

(21) Appl. No.: 12/058,276

(22) Filed: Mar. 28, 2008

(65) Prior Publication Data

US 2008/0244309 A1 Oct. 2, 2008

(30) Foreign Application Priority Data

Mar. 29, 2007 (JP) ............................. 2007-089703

(51) Int. Cl.
*G06F 11/00* (2006.01)
(52) U.S. Cl. .................... 714/3; 714/5; 714/6; 714/7; 714/8; 714/25; 714/42; 714/47; 714/48
(58) Field of Classification Search .............. 714/3, 714/5, 6, 7, 8, 24, 25, 42, 47, 48
See application file for complete search history.

(56) References Cited

U.S. PATENT DOCUMENTS

| 6,079,029 | A  | * | 6/2000  | Iwatani et al. ........... 714/6 |
| 6,223,252 | B1 | * | 4/2001  | Bandera et al. ........ 711/114 |
| 7,373,559 | B2 | * | 5/2008  | Guha ........................ 714/54 |
| 7,409,582 | B2 | * | 8/2008  | McNeill et al. ............ 714/6 |
| 7,434,090 | B2 | * | 10/2008 | Hartung et al. ............ 714/6 |
| 7,434,097 | B2 | * | 10/2008 | Guha et al. ................. 714/7 |
| 2004/0260967 | A1 | * | 12/2004 | Guha et al. ................. 714/3 |
| 2005/0262385 | A1 | * | 11/2005 | McNeill et al. ............ 714/5 |
| 2007/0079170 | A1 | * | 4/2007  | Zimmer et al. ............ 714/6 |
| 2008/0244318 | A1 | * | 10/2008 | Guha ....................... 714/37 |

FOREIGN PATENT DOCUMENTS

| JP | 08190762 A | 7/1996 |
| JP | 1999345095 A | 12/1999 |
| JP | 2000293315 A | 10/2000 |
| JP | 2002116936 A | 4/2002 |
| JP | 2005222186 A | 8/2005 |
| JP | 2006079219 A | 3/2006 |
| JP | 2006277302 A | 10/2006 |

OTHER PUBLICATIONS

Japanese Office Action for JP Application No. 2007-089703 dated Dec. 16, 2008.

* cited by examiner

*Primary Examiner*—Robert Beausoliel
*Assistant Examiner*—Charles Ehne

(57) ABSTRACT

Even if failure probabilities are different for hard disks due to the individual specificity such as a hard disk manufacturer, model number or the like, a disk with high failure probability is reliably determined and removed from the operating RAID to be kept in a standby state as a hot spare disk, thereby keeping a low failure probability of the disk array device. In order to realize this, the disk array device includes a disk controlling unit for, based on S.M.A.R.T. information of each of the hard disks read by a S.M.A.R.T. information reading unit, assigning a predetermined number of hard disks to the hot spare disk in descending order of failure probability of the hard disks.

7 Claims, 4 Drawing Sheets

F I G. 5
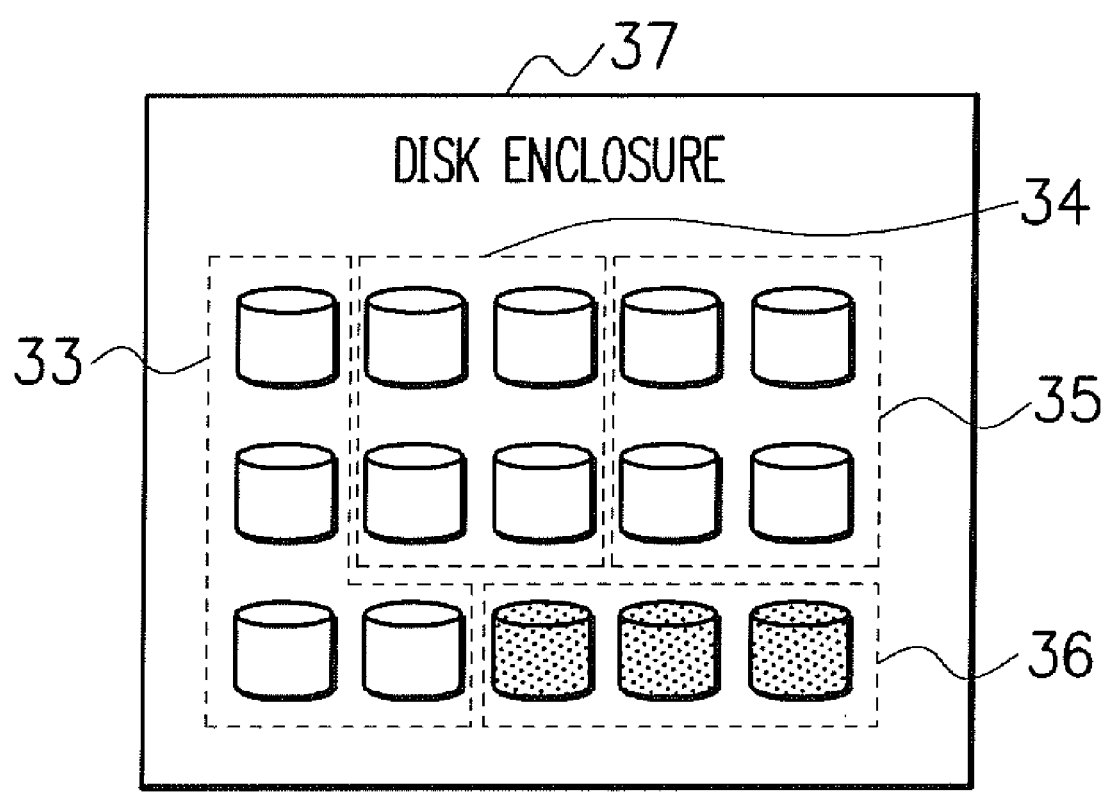

DISK ARRAY DEVICE, OPERATING METHOD THEREOF AND PROGRAM-STORING MEDIUM

This application is based upon and claims the benefit of priority from Japanese patent application No. 2007-089703, filed on Mar. 29, 2007, the disclosure of which is incorporated herein in its entirety by reference.

BACKGROUND OF THE INVENTION

1. Field of the Invention

The present invention relates to a disk array device including a hot spare disk thereby to achieve higher reliability, an operating method of the disk array device and a program-storing medium.

2. Description of the Related Art

Generally, a hot spare disk in a disk array device is in a standby state until a disk comprising RAID (Redundant Array of Inexpensive Disks) fails, and once the disk in operation fails, the disk is replaced with the hot spare disk.

In addition, there is provided a disk array device as a related art of the present invention which performs periodic replacement of each disk with a hot spare disk based on the current-carrying time of the disk. In other words, a disk controller controls the current-carrying time of each disk so that a disk including the longest current-carrying time is replaced with a hot spare disk (see patent document 1: Japanese Patent Laid-open Publication No. 2000-293315, for example).

Further, there is another related art of the present invention which utilizes equalization of cumulative rotation times of respective magnetic disks (see patent document 2: Japanese Patent Laid-open Publication No. 8-190762, for example).

Next description is made about problems of the above-mentioned related arts.

First, in the above-mentioned typical disk array device, it is not until there occurs a trouble that an operating disk is replaced, so there is a problem that the RAID redundancy is reduced or becomes lost between the time when the trouble arises and the time when the replacement is finished.

There is another problem that a hot spare disk remains in the standby state and still new even though only a hard disk comprising RAID is operated for a longer time and its failure probability becomes higher.

Further, as the disk array devices disclosed in the above-mentioned patent documents 1 and 2 do not consider a variety of failure probabilities among disks based on the individual specificity such as hard disk manufacturer, model number or the like, if the individual specificity is largely different between a failure-prone disk and a failure-proof disk, the hard disk with shorter current-carrying time or shorter cumulative rotation time may fail earlier than the hard disk with longer current-carrying time or longer cumulative rotation time. This may finally reduce the effect of decreasing the failure probability of the disk array device as a whole.

SUMMARY OF THE INVENTION

The exemplary object of the present invention is to solve the above-mentioned problems. For this purpose, an exemplary object of the present invention is to provide a disk array device, an operating method of the disk array device and a program-storing medium, the disk array device being capable of reliably determining a disk with a high failure probability and removing the disk from the operating RAID to keep the disk in a standby state as a hot spare disk thereby to keep low failure probability of the disk array device, even if the failure probability varies for each hard disk due to the individual specificity such as a hard disk manufacturer, model number or the like.

In order to achieve the above-mentioned exemplary object, a disk array device according to the present invention is a disk array device characterized by including a plurality of hard disks composing a RAID and a predetermined number of hard disks each arranged as a hot spare disk, the disk array device being characterized by comprising: a S.M.A.R.T. information reading part for reading S.M.A.R.T. information of each of the hard disks included in the disk array device; and a disk controller for, based on the S.M.A.R.T. information of each of the hard disks read by the S.M.A.R.T. information reading part, assigning the predetermined number of hard disks to the hot spare disk in descending order of failure probability of the hard disks.

Further, an operating method of a disk array device according to the present invention is an operating method of a disk array device including a plurality of hard disks composing a RAID and a predetermined number of hard disks each arranged as a hot spare disk, the operating method being characterized by comprising: a S.M.A.R.T. information reading step of reading S.M.A.R.T. information of each of the hard disks included in the disk array device; and a disk controlling step of, based on the S.M.A.R.T. information of each of the hard disks read by the S.M.A.R.T. information reading step, assigning the predetermined number of hard disks to the hot spare disk in descending order of failure probability of the hard disks.

Furthermore, a program-storing medium for storing an operating program of a disk array device according to the present invention is a program-storing medium for storing an operating program of a disk array device including a plurality of hard disks composing a RAID and a predetermined number of hard disks each arranged as a hot spare disk, the program-storing medium being characterized by enabling a computer to execute: S.M.A.R.T. information reading processing for reading S.M.A.R.T. information of each of the hard disks included in the disk array device; and disk controlling processing for, based on the S.M.A.R.T. information of each of the hard disks read by the S.M.A.R.T. information reading processing, assigning the predetermined number of hard disks to the hot spare disk in descending order of failure probability of the hard disks.

BRIEF DESCRIPTION OF THE DRAWINGS

FIG. 5 is a block diagram illustrating a configuration of a disk enclosure according to another exemplary embodiment of the present invention.

DESCRIPTION OF THE EXEMPLARY EMBODIMENTS

With reference to the drawings, an exemplary embodiment to which a disk array device, an operating method of the device, and a program-storing medium according to the present invention are applied will now be described in detail below.

First description is made about main features of the present exemplary embodiment.

In this exemplary embodiment, a disk array device including a hot spare disk is characterized in that a disk with the highest failure probability is selected based on S.M.A.R.T. information of each hard disk and changed into a hot spare disk automatically to be kept in a standby state, thereby keeping a low failure probability of the disk array device as a whole.

Further, as the hot spare disk in the standby state is a disk with the highest failure probability in the disk array device, the hot spare disk is replaced with a new one in regular maintenance thereby keeping a low failure probability of the disk array device as a whole without saving and restoring data every time the failure arises.

Figure 1:
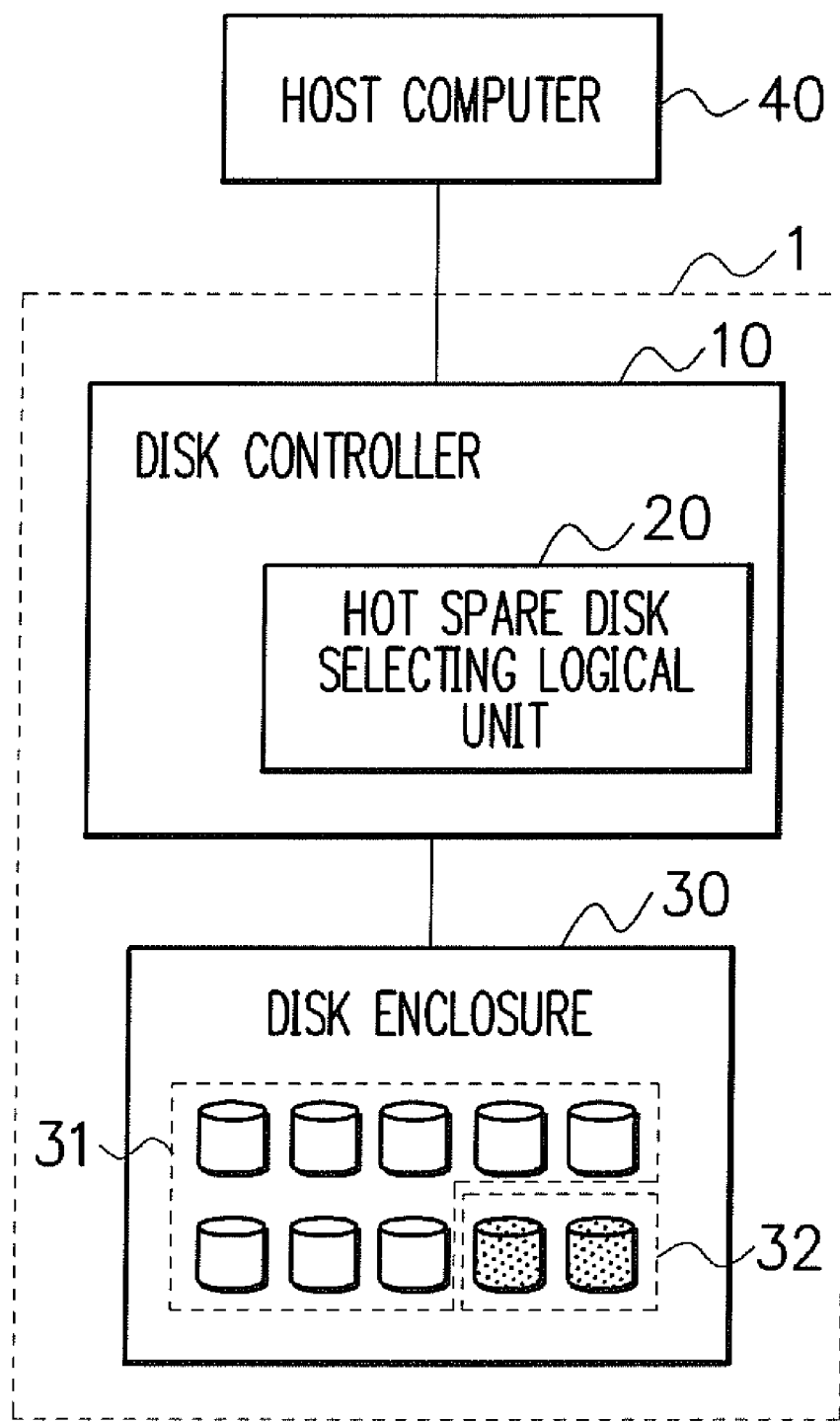
FIG. 1 is a block diagram illustrating a configuration of a disk array device according to one exemplary embodiment of the present invention.

In FIG. 1, a disk array device 1 includes a disk controller 10 and a disk enclosure 30, and a host computer 40 connected thereto performs data reading and writing. The disk controller 10 includes a hot spare disk selecting logical part 20, which reads S.M.A.R.T. information from each disk in the disk enclosure 30 and uses the information to select a hot spare disk 32 (S.M.A.R.T. information reading unit and disk controlling unit).

The S.M.A.R.T. information is information obtained from a hard-disk built-in function, "Self-Monitoring, Analysis and Reporting Technology" (abbreviated as "S.M.A.R.T.") and many hard disks usually include this function.

As the S.M.A.R.T. information is read from the hard disk, it is possible to obtain various kinds of information such as hard disk cumulative current-carrying time, internal temperature, internal error frequency, alternative sector count, number of saving times of magnetic head and the like. Hence, changes of these values are monitored thereby to be able to calculate a remaining lifetime and a failure probability of the hard disk.

The disk enclosure 30 includes a RAID disk part 31 including a plurality of hard disks composing the RAID and hot spare disks 32 that are not incorporated in the RAID and remains in a standby state. The disk controller 10 is used to make any hard disk serve as a RAID hard disk or a hot spare disk. Besides, the disk enclosure 30 includes a function of transmitting S.M.A.R.T. information indicative of each disk's condition to the disk controller 10.

The hot spare disk selecting logical unit 20 receives the S.M.A.R.T. information of each of the disks from the disk enclosure 30 at fixed intervals, calculates a failure probability based on information of used hours and changes in an internal error rate of each of the disks included in the S.M.A.R.T. information, and changes a disk with the highest failure probability at the time point to the hot spare disk 32 to keep the disk in the standby state.

In this way, according to the present exemplary embodiment, as the S.M.A.R.T. information of each of the disks is read at fixed intervals and a disk with the highest failure probability at the time point is changed to a hot spare disk to be kept in the standby state, it is possible to configure the RAID always with a disk with a lower failure probability. With this configuration, it is possible to keep a low failure probability of the disk array device as a whole.

Further, as a hot spare disk with the highest failure probability is exchanged in regular maintenance, it is possible to keep a low failure probability of the disk array device as a whole without saving and restoring data each time the failure arises.

Next description is made in detail about the configuration of this exemplary embodiment with reference to FIG. 1.

As illustrated in FIG. 1, the disk array device 1 includes the disk controller 10 and the disk enclosure 30 connected thereto. This disk array device 1 is connected to the host computer 40, which is used to perform data reading and writing.

The disk controller 10 includes the hot spare disk selecting logical unit 20, which reads the S.M.A.R.T. information from each disk in the disk enclosure 30 and uses the information to select the hot spare disk 32.

The disk enclosure 30 includes the RAID disk part 31 which comprises the RAID and the hot spare disks 32 which are not incorporated in the RAID disk part 31 and kept in the standby state. Any disk can serve as a RAID disk or a hot spare disk by control of the disk controller 10. The disk enclosure 30 includes a function of transmitting the S.M.A.R.T. information indicative of each disk's condition to the disk controller 10.

The hot spare disk selecting logical unit 20 receives the S.M.A.R.T. information of each of the disks from the disk enclosure 30 at the predetermined fixed intervals, calculates the failure probability based on the information of used hours and changes in the internal error rate of each of the disks included in the S.M.A.R.T. information, and changes a disk of the highest failure probability at the time point to the hot spare disk 32 to keep the disk in the standby state.

In this way, the disk array device according to this exemplary embodiment includes the disk controller 10 for performing data reading and writing onto each disk in the disk enclosure 30 and the disk enclosure 30, connected to the plural disks, to set the configuration of the RAID or to allocate the hot spare disks in any combinations. The disk controller 10 includes the hot spare disk selecting logical unit 20 for reading the S.M.A.R.T. information of each disk and selecting a disk with a higher failure probability as a hot spare disk.

The hot spare disk selecting logical unit 20 calculates the failure probability of each disk based on the S.M.A.R.T. information and selects a disk with the highest failure probability as a hot spare disk.

The disk controller 10 includes a function of controlling each of the disks in the disk enclosure 30 and a function of freely combining any disks to configure the RAID disk part 31 and also making any disks serve as hot spare disks.

When a failure arises in the plural hard disks composing the RAID disk portion 31, the failed disk is removed from the RAID disk portion 31 and a disk with a lowest failure probability among the hot spare disks 32 is incorporated into the RAID disk part 31.

Next description is made about the operation of the disk array device according to the present exemplary embodiment.

When the disk array device 1 operates normally, the hot spare disk selecting logical unit 20 collects S.M.A.R.T. information of all disks in the disk enclosure 30 at the fixed intervals. This information-collecting interval may be once in a week, for example.

The disk controller 10 determines the change rate by checking the S.M.A.R.T. information against the old S.M.A.R.T. information for each of the disks and calculates a failure probability of the disk. For example, if the MTBF (mean time between failures) in brand new condition is known, the predicted failure time can be obtained from the cumulative current-carrying time in the S.M.A.R.T. information as shown in FIG. 2.

Figure 3:
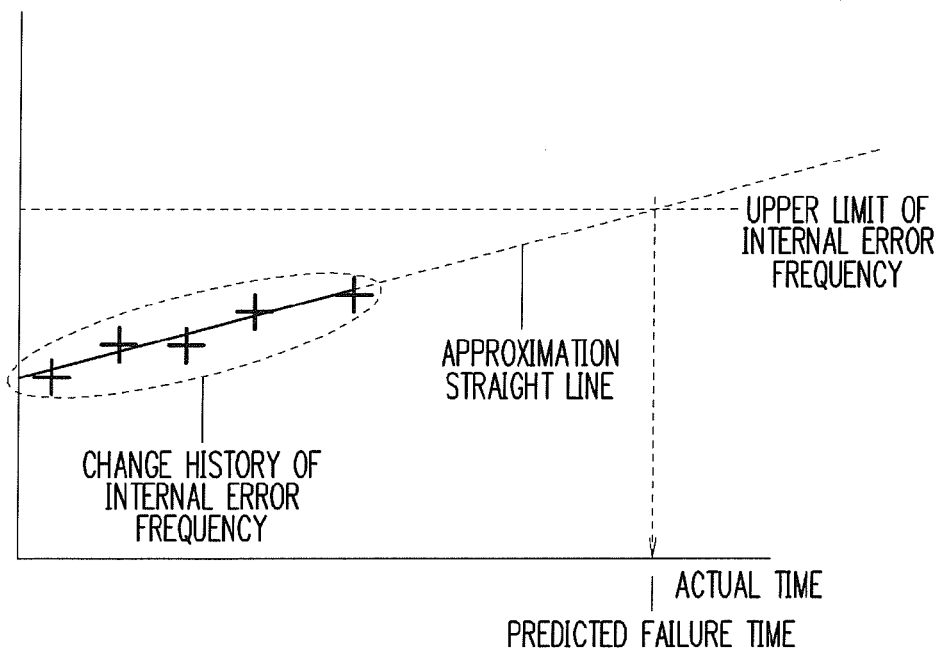
FIG. 3 is a view showing a method of determining a disk failure probability by use of an internal error frequency.

When the internal error frequency is used, the predicted failure time can be obtained from a change history of the error frequency and an upper limit of the failure frequency for failure judgment as shown in FIG. 3. Besides, the predicted failure time can be also obtained with use of a value changing as the disk operates, such as the number of saving times of disk head, and its upper and lower limits.

Thus, according to the present exemplary embodiment, the S.M.A.R.T. information of the hard disk is used to predict a remaining lifetime of the hard disk based on a time-varying change of each value of the S.M.A.R.T. information and threshold values set by a manufacturer or a disk array vender, and this prediction is performed for each hard disk included in the disk array device.

Figure 2:
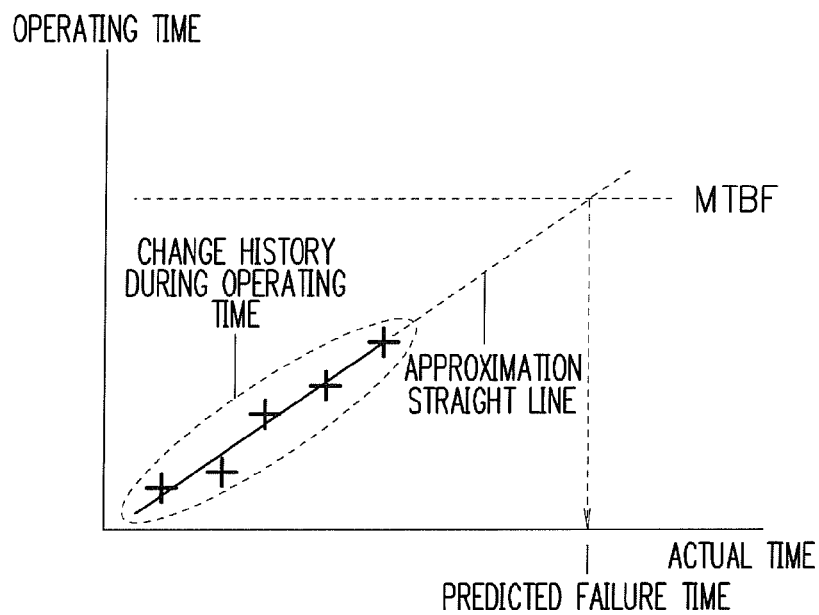
FIG. 2 is a view showing a method of determining a disk failure probability by use of the MTBF in brand new conditions.

Specifically, as shown in FIGS. 2 and 3, graphs are created in which an X axis indicates an elapsed time and a Y axis indicates each parameter, and a linear function for making approximations of the time-varying change of the each parameter is obtained, and then, a point of intersection of the upper limit (or the lower limit) of the each parameter and the linear function is found to use the time corresponding to the point of intersection as the predicted failure time. The parameter used here may be one or more in number. If a plurality of parameters is used, a value indicative of the earliest predicted failure time (the shortest remaining lifetime) is used as a remaining lifetime of the hard disk (remaining time left until the predicted failure time).

Used as upper and lower limits of each parameter may be threshold values registered in the S.M.A.R.T. information for each hard disk by the manufacturer. As the criteria for determining the setting values is different for manufacturers or model numbers, in some case, a user may input setting to the disk array device 1 thereby to correct the values to set the criteria being more severe or easier. Usually, the model number or manufacturer of each hard disk is readable through SCSI (Small Computer System Interface) command or the like.

In this exemplary embodiment, as the predicted failure time is thus calculated, the failure time of individual hard disks can be predicted accurately even if the hard disks included in the disk array device are different in manufacturer or model number.

In this way, the hot spare disk selecting logical unit 20 calculates the earliest predicted failure time based on one or more pieces of the S.M.A.R.T. information for each disk, and in reexamining which hard disk is better to be assigned to the hot spare disk, sets a disk with the earliest predicted failure time as a new hot spare disk. When plural hot spare disks are provided, a predetermined number of disks selected in ascending order of the remaining time until the predicted failure time are used as the hot spare disks.

When a hot spare disk selected last time is different from a hot spare disk selected this time, contents of the disk selected this time as the hot spare disk are copied to the disk that is to be returned from the hot spare disk to the RAID disk part 31 while data synchronization is performed and then, the disks are replaced.

Figure 4:
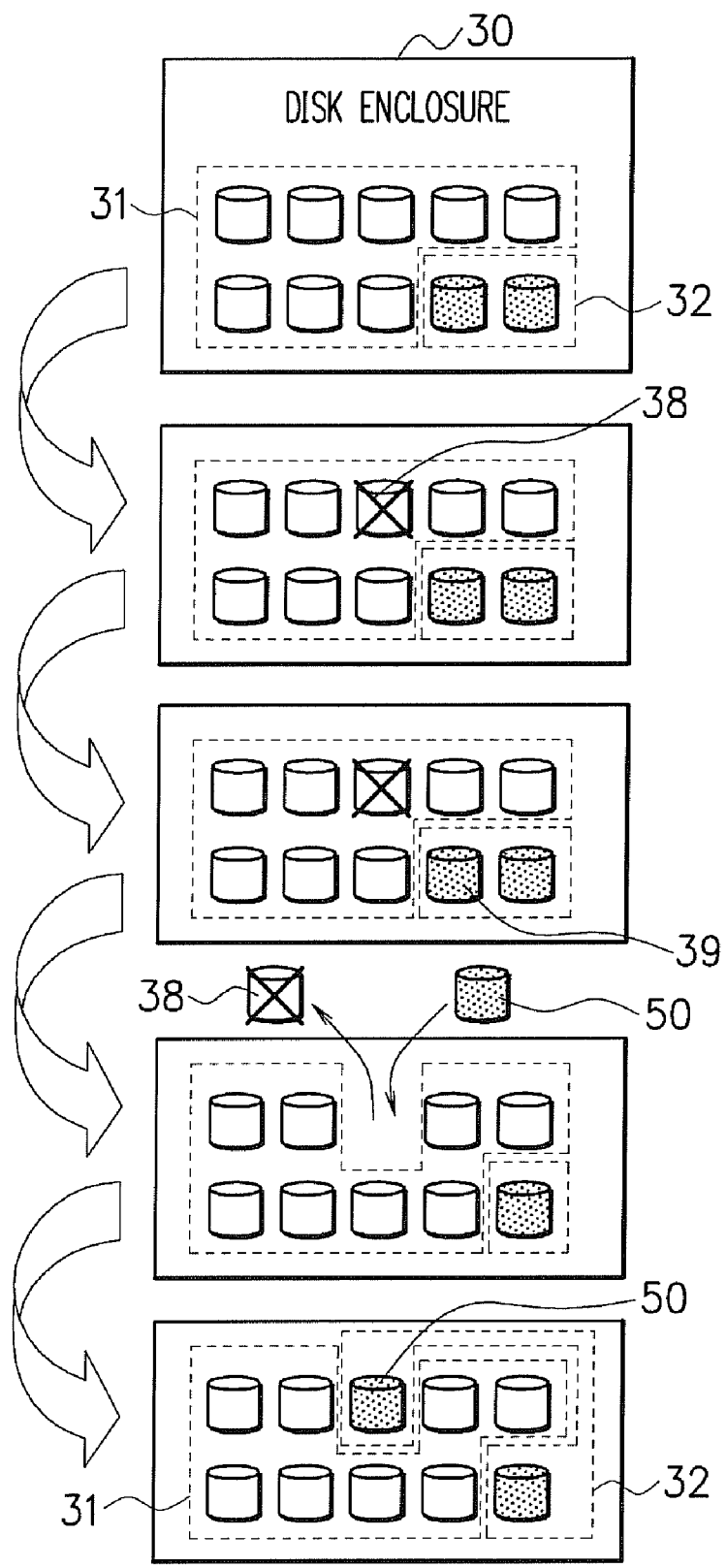
FIG. 4 is a view showing an operation example when a disk failure has occurred in an operating RAID disk portion.

Next description is made, with reference to FIGS. 1 and 4, about the operation when there occurs a failure in a hard disk in the RAID disk part 31 in operation.

The description treats an example where one hard disk 38 composing RAID disk part 31 has failed. First, the hot spare disk selecting logical unit 20 in FIG. 1 selects a disk with the lowest failure probability 39 among hot spare disks 32 and incorporates the disk 39 into the RAID disk part 31.

The data of the disk 39 is recovered with data of another disk composing the RAID disk part 31 by the disk controller 10 in FIG. 1. The failed disk 38 is replaced with a normal disk 50 in regular or temporary maintenance, which disk 50 is incorporated in the hot spare disks 32. When the replaced normal disk 50 has a lower failure probability than disks in the RAID disk part 31 in operation, the disk 50 is then exchanged by the hot spare disk selecting logical unit 20.

Next description is made about the operation when the hot spare disk 32 in the standby state has failed.

When one of the hot spare disks 32 has failed, data saving and recovery are not required, and nothing is performed just after occurrence of the failure. The failed disk is exchanged in regular or temporary maintenance into a normal disk to be incorporated into the hot spare disks 32. If the replaced normal disk has a lower failure probability than disks in the RAID disk part 32 in operation, the disk is then exchanged by the hot spare disk selecting logical unit 20.

For this configuration, the RAID disk part 31 in operation is always comprised of hard disks with longer remaining times left until the respective predicted failure times, and the hot spare disks 32 in standby state are disks with relatively shorter remaining times left until the respective predicted failure times. This makes it possible to keep a low failure probability of the disk array device 1 as a whole.

From the description made up to this point, the present exemplary embodiment produces the following effects:

First, the S.M.A.R.T. information of each disk is used as a basis to obtain a failure probability of each of the disk, a disk with a lower failure probability is arranged as one operating disk of the RAID, a disk with higher failure probability is removed from the RAID and kept in standby state as a hot spare disk. With this configuration, the RAID is always composed of disks with lower failure probabilities and it is possible to keep a low failure probability of the disk array device.

Second, as a disk with the highest failure probability is a hot spare disk and in standby state, the hot spare disk can be exchanged to a new one during maintenance of the disk array device. With this configuration, the failure probability of the disk array device as a whole can be always kept low and there is no need to consume time for data saving and recovery each time of failure or disk change.

Further, as the maintenance is carried out regularly for exchange of a hot spare disk which is out of operation and presents a higher failure probability, the failure probability of the disk array device can be always kept low.

Furthermore, as calculation of the predicted failure time used for determination of such failure probability is performed based on the S.M.A.R.T. information of each hard disk, even if hard disks which are different in manufacturer or model number are included in the disk array device, the failure time can be accurately predicted for each hard disk and the failure probability of the disk array device as a whole can be reliably kept low.

Another Exemplary Embodiment

Next description is made about another exemplary embodiment of the present invention. In this exemplary embodiment, the fundamental structure is the same as that of the above-described exemplary embodiment, however, further thought or idea is added to disk replacement with use of the S.M.A.R.T. information.

As illustrated in FIG. 5, a disk enclosure 37 includes a first RAID disk part 33, a second RAID disk part 34, a third RAID disk part 35 and hot spare disks 36. When the access frequency to the disks is different among the RAID disk parts, the disk controller 10 assigns a disk with the longest remaining time left until the predicted failure time to a RAID disk part with the highest access frequency, a disk with the second longest remaining time left until the predicted failure time to a RAID disk part with the second highest access frequency, and a disk with the third longest remaining time left until the predicted failure time to a RAID disk part with the third highest access frequency, and assigns a disk with the shortest remaining time left until the predicted failure time to the hot spare disk 36.

In this way, in the disk array device of this exemplary embodiment, the disk controller 10 obtains the access frequency information to each of the RAID disk parts, and assigns hard disks to RAID disk parts in descending order of remaining time left until the predicted failure time of the hard disk and in descending order of access frequency of the RAID disk part, and also assigns a predetermined number of hard disks in ascending order of remaining time left until the predicted failure time to the hot spare disk 36.

As described up to this point, according to this exemplary embodiment, the failure probabilities of respective RAID disk parts are equalized to prevent such a problem that a hard disk composing the RAID disk part with a higher access frequency is only more likely to fail, thereby achieving the effect of reducing the failure probability of the disk array device as a whole.

Here, this exemplary embodiment can also apply to the case where the structure includes two, or four or more RAIDs, and identical effects can be achieved.

Each of the Exemplary Embodiments

For example, the process for realizing a disk array device according to each of the above-described exemplary embodiments is stored in a storing medium as a program. This makes it possible to realize each of the above-described functions according to the exemplary embodiments of the present invention by processing of CPU of a system computer based on the program supplied from the storing medium.

In this case, the present invention is also applicable to the case where information pieces including the program are supplied from the above-mentioned storing medium, or an external storing medium via a network, to an output device.

In other words, a program code read from the storing medium in itself realizes new functions of the present invention, and the storing medium with the program code stored thereon and a signal read from the storing medium are composing the present invention.

Used as this storing medium may be a flexible disk, a hard disk, an optical disk, an optical magnetic disk, a CD-ROM, a CD-R, a CD-RW, a DVD-ROM, a DVD-RAM, a DVD-RW, DVD+RW, a magnetic tape, a nonvolatile memory card, a ROM and the like, for example.

According to the program-storing medium of the present invention, it is possible to realize in a computer controlled by the program each of the functions of a disk array device according to each of the above-described exemplary embodiments of the present invention.

As described above, the disk array device according to the present invention is a disk array device characterized by including a plurality of hard disks composing a RAID and a predetermined number of hard disks each arranged as a hot spare disk, the disk array device being characterized by comprising: S.M.A.R.T. information reading means for reading S.M.A.R.T. information of each of the hard disks included in the disk array device; and disk controlling means for, based on the S.M.A.R.T. information of each of the hard disks read by the S.M.A.R.T. information reading means, assigning the predetermined number of hard disks to the hot spare disk in descending order of failure probability of the hard disks.

In addition, preferably, the disk array device comprises a plurality of RAIDs each composed of the plurality of hard disks, further comprises access frequency obtaining means for obtaining access frequency information to each of the RAIDs, and the disk controlling means is configured to, based on the access frequency information to each of the RAIDs obtained by the access frequency obtaining means and the S.M.A.R.T. information of each of the hard disks read by the S.M.A.R.T. information reading means, assign hard disks with lower failure probabilities to the RAIDs in descending order of access frequency of the RAIDs and assign a predetermined number of hard disks to the hot spare disks in descending order of failure probability of the hard disks.

More preferably, in reexamination of which of the hard disks to be assigned to the hot spare disk, the disk controlling means calculates an earliest predicted failure time of each of the hard disks based on the S.M.A.R.T. information of each of the hard disks read by the S.M.A.R.T. information reading means, and assigns a hard disk with a shortest time left until the predicted failure time to the hot spare disk.

More preferably, the S.M.A.R.T. information reading means reads the S.M.A.R.T. information of each of the hard disks at predetermined fixed intervals.

Further, an operating method of a disk array device according to the present invention is an operating method of a disk array device including a plurality of hard disks composing a RAID and a predetermined number of hard disks each arranged as a hot spare disk, the operating method being characterized by comprising: a S.M.A.R.T. information reading step of reading S.M.A.R.T. information of each of the hard disks included in the disk array device; and a disk controlling step of, based on the S.M.A.R.T. information of each of the hard disks read by the S.M.A.R.T. information reading step, assigning the predetermined number of hard disks to the hot spare disk in descending order of failure probability of the hard disks.

Preferably, the disk array device comprises a plurality of RAIDs each composed of the plurality of hard disks, the operating method further comprises an access frequency obtaining step of obtaining access frequency information to each of the RAIDs, and in the disk controlling step, the access frequency information to each of the RAIDs obtained by the access frequency obtaining step and the S.M.A.R.T. information of each of the hard disks read by the S.M.A.R.T. information reading step are used as a basis to assign hard disks with lower failure probabilities to the RAIDs in descending order of access frequency of the RAIDs and to assign the predetermined number of hard disks to the hot spare disks in descending order of failure probability of the hard disks.

More preferably, in the disk controlling step, in reexamination of which of the hard disks to be assigned to the hot spare disk, the S.M.A.R.T. information of each of the hard disks read by the S.M.A.R.T. information reading step is used as a basis to calculate an earliest predicted failure time of each of the hard disks and to assign a hard disk with a shortest time left until the predicted failure time to the hot spare disk.

More preferably, in the S.M.A.R.T. information reading step, reading of the S.M.A.R.T. information of each of the hard disks is performed at predetermined fixed intervals.

Furthermore, a program-storing medium for storing an operating program of a disk array device according to the present invention is a program-storing medium for storing an operating program of a disk array device including a plurality of hard disks composing a RAID and a predetermined number of hard disks each arranged as a hot spare disk, the program-storing medium being characterized by enabling a computer to execute: S.M.A.R.T. information reading processing for reading S.M.A.R.T. information of each of the hard disks included in the disk array device; and disk controlling processing for, based on the S.M.A.R.T. information of each of the hard disks read by the S.M.A.R.T. information reading processing, assigning the predetermined number of hard disks to the hot spare disk in descending order of failure probability of the hard disks.

Preferably, the disk array device comprises a plurality of RAIDs each composed of the plurality of hard disks, the program-storing medium further enables the computer to execute access frequency obtaining processing for obtaining access frequency information to each of the RAIDs, and in the disk controlling processing, the access frequency information to each of the RAIDs obtained by the access frequency obtaining processing and the S.M.A.R.T. information of each of the hard disks read by the S.M.A.R.T. information reading processing are used as a basis to assign hard disks with lower failure probabilities to the RAIDs in descending order of access frequency of the RAIDs and to assign the predetermined number of hard disks to the hot spare disks in descending order of failure probability of the hard disks.

More preferably, in the disk controlling processing, in reexamination of which of the hard disks to be assigned to the hot spare disk, the S.M.A.R.T. information of each of the hard disks read by the S.M.A.R.T. information reading processing is used as a basis to calculate an earliest predicted failure time of each of the hard disks and to assign a hard disk with a shortest time left until the predicted failure time to the hot spare disk.

More preferably, in the S.M.A.R.T. information reading processing, reading of the S.M.A.R.T. information of each of the hard disks is performed at predetermined fixed intervals.

As described up to this point, according to the present invention, even when failure probabilities are different for different hard disks due to different manufacturers or model numbers, a disk with high failure probability is reliably determined and removed from the operating RAID to be arranged in the standby state as a hot spare disk. With this configuration, it is possible to keep a low failure probability of the disk array device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A disk array device characterized by including a plurality of hard disks composing a RAID and a predetermined number of hard disks each arranged as a hot spare disk, the disk array device being characterized by comprising:
  a S.M.A.R.T. information reading part for reading S.M.A.R.T. information of each of the hard disks included in the disk array device; and
  a disk controller for, based on the S.M.A.R.T. information of each of the hard disks read by the S.M.A.R.T. information reading part, assigning a predetermined number of hard disks to the hot spare disk in descending order of failure probability of the hard disk, wherein
  a plurality of RAIDs each composed of the plurality of hard disks is arranged,
  the disk array device further comprises an access frequency obtaining part for obtaining access frequency information to each of the RAIDs, and
  the disk controller is configured to, based on the access frequency information to each of the RAIDs obtained by the access frequency obtaining part and the S.M.A.R.T. information of each of the hard disks read by the S.M.A.R.T. information reading part, assign hard disks with lower failure probabilities to the RAIDs in descending order of access frequency of the RAIDs and assign a predetermined number of hard disks to the hot spare disk in descending order of failure probability of the hard disks.

2. The disk array device of claim 1, wherein in reexamination of which of the hard disks to be assigned to the hot spare disk, the disk controller calculates an earliest predicted failure time of each of the hard disks based on the S.M.A.R.T. information of each of the hard disks read by the S.M.A.R.T. information reading part, and assigns a hard disk with a shortest time left until the predicted failure time to the hot spare disk.

3. A disk array device characterized by including a plurality of hard disks composing a RAID and a predetermined number of hard disks each arranged as a hot spare disk, the disk array device being characterized by comprising:
  S.M.A.R.T. information reading means for reading S.M.A.R.T. information of each of the hard disks included in the disk array device; and
  disk controlling means for, based on the S.M.A.R.T. information of each of the hard disks read by the S.M.A.R.T. information reading means, assigning a predetermined number of hard disks to the hot spare disk in descending order of failure probability of the hard disks, wherein
  a plurality of RAIDs each composed of the plurality of hard disks is arranged,
  the disk array device further comprises an access frequency obtaining means for obtaining access frequency information to each of the RAIDs, and
  the disk controlling means is configured to, based on the access frequency information to each of the RAIDs obtained by the access frequency obtaining means and the S.M.A.R.T. information of each of the hard disks read by the S.M.A.R.T. information reading means, assign hard disks with lower failure probabilities to the RAIDs in descending order of access frequency of the RAIDs and assign a predetermined number of hard disks to the hot spare disk in descending order of failure probability of the hard disks.

4. An operating method of a disk array device including a plurality of hard disks composing a RAID and a predetermined number of hard disks each arranged as a hot spare disk, the operating method being characterized by comprising:
  a S.M.A.R.T. information reading step of reading S.M.A.R.T. information of each of the hard disks included in the disk array device; and
  a disk controlling step of, based on the S.M.A.R.T. information of each of the hard disks read by the S.M.A.R.T. information reading step, assigning the predetermined number of hard disks to the hot spare disk in descending order of failure probability of the hard disks, wherein
  a plurality of RAIDs each composed of the plurality of hard disks are arranged in the disk array device,
  the operating method further comprises an access frequency obtaining step of obtaining access frequency information to each of the RAIDs, and
  in the disk controlling step, the access frequency information to each of the RAIDs obtained by the access frequency obtaining step and the S.M.A.R.T. information of each of the hard disks read by the S.M.A.R.T. information reading step are used as a basis to assign hard disks with lower failure probabilities to the RAIDs in descending order of access frequency of the RAIDs and to assign a predetermined number of hard disks to the hot spare disk in descending order of failure probability of the hard disks.

5. The operating method of the disk array device of claim 4, wherein in the disk controlling step, in reexamination of which of the hard disks to be assigned to the hot spare disk, the S.M.A.R.T. information of each of the hard disks read by the S.M.A.R.T. information reading step is used as a basis to calculate an earliest predicted failure time of each of the hard disks and assign a hard disk with a shortest time left until the predicted failure time to the hot spare disk.

6. A program-storing medium for storing an operating program of a disk array device including a plurality of hard disks composing a RAID and a predetermined number of hard disks each arranged as a hot spare disk, the program-storing medium being characterized by enabling a computer to execute:

S.M.A.R.T. information reading processing for reading S.M.A.R.T. information of each of the hard disks included in the disk array device; and disk controlling processing for, based on the S.M.A.R.T. information of each of the hard disks read in the S.M.A.R.T. information reading processing, assigning a predetermined number of hard disks to the hot spare disk in descending order of failure probability of the hard disks, wherein a plurality of RAIDs each composed of the plurality of hard disks are arranged in the disk array device, the program-storing medium further enables the computer to execute access frequency obtaining processing for obtaining access frequency information to each of the RAIDs, and in the disk controlling processing, the access frequency information to each of the RAIDs obtained by the access frequency obtaining processing and the S.M.A.R.T. information of each of the hard disks read by the S.M.A.R.T. information reading processing are used as a basis to assign hard disks with lower failure probabilities to the RAIDs in descending order of access frequency of the RAIDs and to assign the predetermined number of hard disks to the hot spare disk in descending order of failure probability of the hard disks.

7. The program-storing medium for storing the operating program of the disk array device of claim 6, wherein in the disk controlling processing, in reexamination of which of the hard disks to be assigned to the hot spare disk, the S.M.A.R.T. information of each of the hard disks read by the S.M.A.R.T. information reading processing is used as a basis to calculate an earliest predicted failure time of each of the hard disks and to assign a hard disk of shortest time left until the predicted failure time to the hot spare disk.

* * * * *